United States Patent
Sasago

(10) Patent No.: US 8,100,142 B2
(45) Date of Patent: Jan. 24, 2012

(54) BLEED-TYPE ELECTROMAGNETIC VALVE

(75) Inventor: Shunpei Sasago, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 547 days.

(21) Appl. No.: 12/382,852

(22) Filed: Mar. 25, 2009

(65) Prior Publication Data
US 2009/0256094 A1    Oct. 15, 2009

(30) Foreign Application Priority Data
Mar. 28, 2008   (JP) .................. 2008-086687

(51) Int. Cl.
*F16K 31/06*   (2006.01)
(52) U.S. Cl. .................. 137/596.17; 137/596.2
(58) Field of Classification Search .................. 137/596, 137/596.1, 596.17, 596.2
See application file for complete search history.

(56) References Cited

U.S. PATENT DOCUMENTS

| 6,386,218 | B1 | 5/2002 | Ness et al. | |
|---|---|---|---|---|
| 7,036,525 | B2 * | 5/2006 | Ichinose et al. | 137/596.17 |
| 7,543,603 | B2 * | 6/2009 | Wang et al. | 137/596.2 |
| 7,717,128 | B2 * | 5/2010 | Pataki | 137/596.17 |
| 2005/0098211 | A1 | 5/2005 | Ichinose et al. | |

FOREIGN PATENT DOCUMENTS

| JP | A-2001-153245 | 6/2001 |
|---|---|---|
| JP | A-2002-286152 | 10/2002 |
| JP | A-2005-140277 | 6/2005 |
| JP | A-2006-349142 | 12/2006 |

* cited by examiner

*Primary Examiner* — Craig Schneider
(74) *Attorney, Agent, or Firm* — Oliff & Berridge, PLC

(57) ABSTRACT

A bleed solenoid valve that includes a valve main body that is hollow and formed with an input port, an output port, and a discharge port; a flow-changing part that is accommodated inside the valve main body and formed with a first flow path and a second flow path, a valve shaft that is accommodated inside the flow-changing part; and a solenoid part that moves the valve shaft in the axial direction.

5 Claims, 3 Drawing Sheets

BLEED-TYPE ELECTROMAGNETIC VALVE

CROSS-REFERENCE TO RELATED APPLICATION

The disclosure of Japanese Patent Application No. 2008-086687 filed on Mar. 28, 2008, including the specification, drawings and abstract is incorporated herein by reference in its entirety.

BACKGROUND

The present invention is related to a bleed solenoid valve.

A conventional type of bleed solenoid valve has an output pressure chamber, a ball valve body, a rod part, a bleed valve body part, and an electromagnetic part (see Patent Document 1 for an example). The output pressure chamber is formed with an output port that is in communication with a feeding port via an orifice and in communication with a drain port via a communication hole formed in an axial direction. The ball valve body contacts an outer edge of the orifice from the feeding port side and is capable of blocking communication with the output pressure chamber. The rod part is capable of contacting the ball valve body through the orifice from the output pressure chamber side. The rod part is also fixed to the bleed valve body part. The electromagnetic part moves the bleed valve body part using a suction force generated by conduction through a coil. In this solenoid valve, when no electricity is conducted, the rod part contacts the ball valve body to open the orifice and communicate the feeding port with the output port, and the ball valve body part contacts the outer edge of the communication hole to block communication to the drain port. When electricity is conducted, the orifice and the communication hole are opened to a degree that corresponds to the movement position of the bleed valve body part in order to communicate the feeding port with the output port, and communicate the output port with the drain port.

Patent Document 1: Japanese Patent Application Publication No. JP-A-2002-286152

SUMMARY

According to the bleed solenoid valve described above, adjusting a discharge amount discharged from the drain port with respect to a supply amount fed from the feeding port enables adjustment of an output amount output from the output port, and the output amount is often increased by increasing the discharge amount. Therefore, in order to increase the output amount, a pump is operated at high load to increase the supply amount, which results in an increased discharge amount. However, this is accompanied by reduced operation efficiency. Especially in a direct control that adjusts high-pressure hydraulic oil to a line pressure, for example, and directly feeds such hydraulic oil to a friction engagement element such as a clutch or brake, the large supply amount of hydraulic oil further increases the discharge amount. As a consequence, in addition to reduced operation efficiency, the pump is also subject to an increased load, which may necessitate enlarging the size of the pump.

It is a main object of the present invention to secure a required output amount in a bleed solenoid valve while suppressing a discharge amount.

The present invention employs the following means to achieve the main object described above.

A bleed solenoid valve of the present invention includes: a valve main body that is hollow and formed with an input port into which hydraulic fluid flows in an axial direction, an output port that outputs hydraulic fluid sideward, and a discharge port that discharges hydraulic fluid sideward; a flow-changing part that is accommodated inside the valve main body, and formed with a first flow path, wherein hydraulic oil that enters through the input port and flows inside due to a throttle may be output from the output port and discharged from the drain port, and a second flow path, wherein hydraulic oil is directly output from the output port without passing through the throttle, with the flow-changing part switching between blocking and opening the second flow path in accordance with movement in the axial direction; a valve shaft that is accommodated inside the flow-changing part, and capable of switching among a state in which the discharge port is closed with axial movement of the flow-changing part and the valve shaft, and hydraulic oil flows through the first flow path and the second flow path, a state in which the second flow path is blocked and hydraulic fluid flows through the first flow path with adjustment of the open state of the discharge port, and a state in which the input port is closed and the output port is in communication with the discharge port; and a solenoid part that moves the valve shaft in the axial direction.

In the bleed solenoid valve of the present invention, the flow-changing part is accommodated inside the hollow valve main body, which is formed with the input port into which hydraulic fluid flows in the axial direction, the output port that outputs hydraulic fluid sideward, and the discharge port that discharges hydraulic fluid sideward. In addition, the flow changing-part is formed with the first flow path, wherein hydraulic fluid that enters through the input port and flows inside due to the throttle may be output from the output port and discharged from the drain port, and the second flow path, wherein hydraulic fluid is directly output from the output port without passing through the throttle. Using the flow-changing part and the valve shaft accommodated inside the flow-changing part, switching is performed among a state in which the discharge port is closed with axial movement of the flow-changing part and the valve shaft, and hydraulic fluid flows through the first flow path and the second flow path, a state in which the second flow path is blocked and hydraulic fluid flows through the first flow path with adjustment of the open state of the discharge port, and a state in which the input port is closed and the output port is in communication with the discharge port. Accordingly, depending on an output amount to be output from the output port, hydraulic fluid entering through the input port can be passed through the first and second flow paths and output from the output port. Also, the second flow path can be blocked and a small input amount of hydraulic fluid entering through the throttle can be passed through the first flow path and output from the output port with adjustment of a discharge amount from the discharge port. Thus, in the bleed solenoid valve, a required output amount can be secured while suppressing the discharge amount.

According to the above bleed solenoid valve of the present invention, the flow-changing part may be a hollow member having an end part that is formed with an opening part having a diameter smaller than the input port. Furthermore, entry through the opening part may correspond to the throttle of the first flow path, and the second flow path may be set between an outer peripheral face of the flow-changing part and an inner peripheral face of the valve main body. When the flow-changing part contacts the valve main body in accordance with axial movement, the second flow path may be blocked by a face of the flow-changing part contacting the valve main body. Thus, the flow paths can be switched with a relatively simple configuration. In the bleed solenoid valve of the present invention according to this aspect, the flow-changing part may be attached with biasing means that biases the valve shaft toward the solenoid part side. Furthermore, the valve shaft may terminate contact with the flow-changing part due to the biasing force of the biasing means to release the throttle and block communication between the output port and the discharge port when the solenoid part is not driving. The valve shaft may also move in cooperation with the flow-changing part while the throttle remains open through the biasing force of the biasing means until the flow-changing part contacts the valve main body when the solenoid part is driving, so as to move in a direction that gradually blocks the second flow path. The valve shaft may further move after the flow-changing part contacts the valve main body to block the second flow path without moving in cooperation with the flow-changing part against the biasing force when the driving force of the solenoid part exceeds the biasing force of the biasing means. In addition, the valve shaft may use a flow path that becomes larger nearer the throttle to communicate the output port with the discharge port, and contact the flow-changing part in the axial direction, whereby the throttle is blocked by a face of the flow-changing part contacting the valve shaft and the output port communicates with the discharge port. Thus, the flow paths can be smoothly switched.

According to the bleed solenoid valve of the present invention, the valve main body may include an output pressure chamber formed such that a fluid pressure that acts on the flow-changing part due to hydraulic fluid laterally entering and being input through the input port is partially canceled out by a fluid pressure acting in a direction opposite to said fluid pressure. Thus, a fluid pressure acting on the flow-changing part can be optimized using hydraulic fluid that is input through the input port.

According to the bleed solenoid valve of the present invention, the bleed solenoid valve may be a valve capable of inputting a line pressure adjusted by a regulator valve through the input port and adjusting the input line pressure, and outputting a direct hydraulic pressure through the output port to one of a clutch and a brake incorporated in an automatic transmission that receives a supply of hydraulic pressure to operate. Compared to an electromagnetic valve that inputs a pilot pressure, which is adjusted using as input a modulator pressure that is the line pressure decreased to a fixed pressure, to a control valve for adjusting the line pressure, the input pressure is a higher line pressure and a larger discharge amount is discharged from the discharge port in the present invention. Therefore, application of the present invention has great merit.

DETAILED DESCRIPTION OF EMBODIMENTS

Next, an embodiment will be used to describe a best mode for carrying out the present invention.

Figure 1:
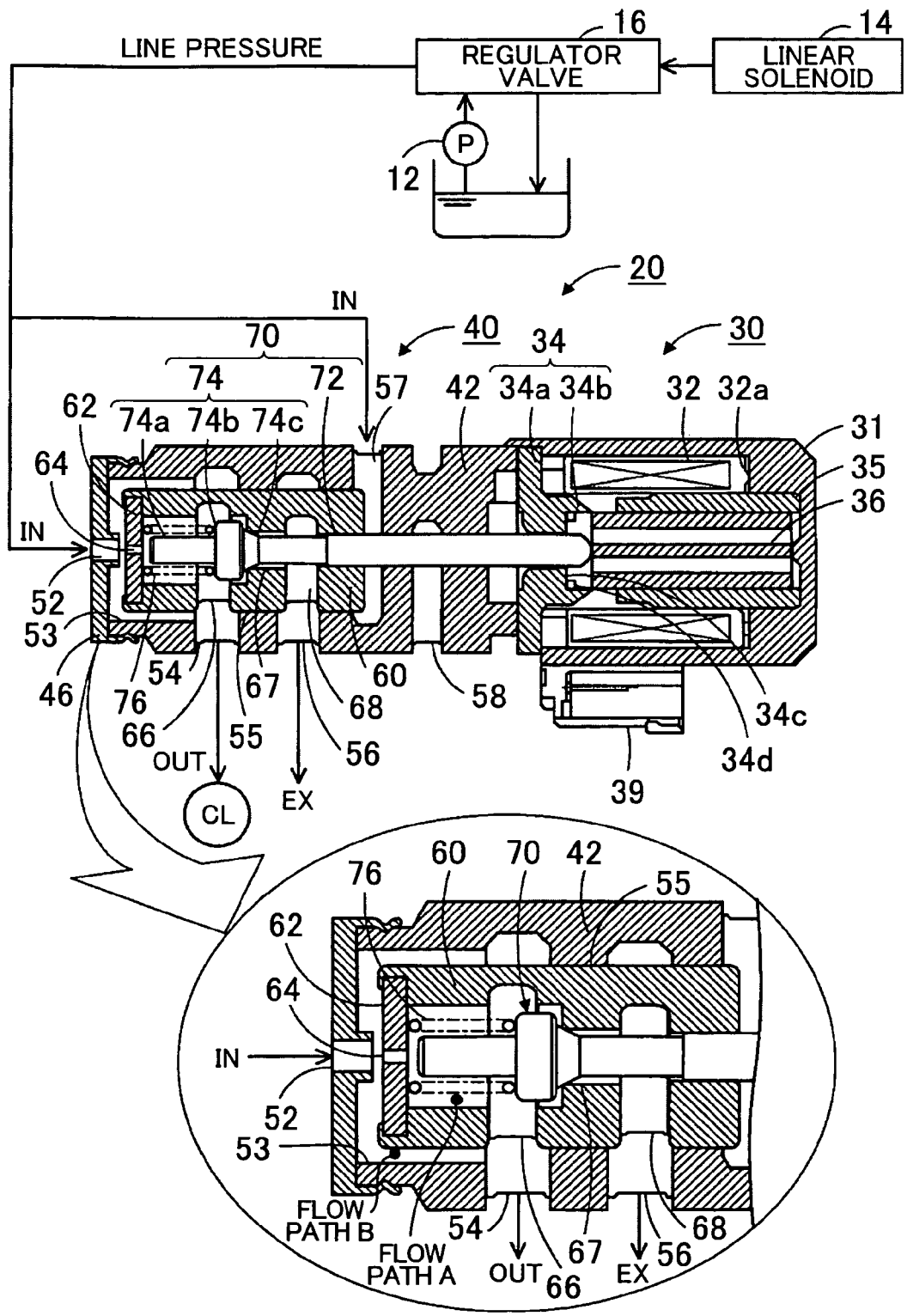
FIG. 1 is a structural diagram that shows an outline of the constitution of an electromagnetic valve 20 serving as an embodiment of the present invention.

FIG. 1 is a structural diagram that shows an outline of the constitution of an electromagnetic valve 20 serving as an embodiment of the present invention. The electromagnetic valve 20 of the present embodiment is used in a hydraulic control of a friction engagement elements such as a clutch or brake that is incorporated into an automatic transmission, for example. The electromagnetic valve 20 is configured as a bleed linear solenoid valve for a direct control, wherein pressure is delivered from an oil pump 12, and a linear solenoid 14 is used by a regulator valve 16 to adjust a hydraulic pressure (line pressure) and thereby generate an optimal clutch pressure to enable direct control of a friction engagement element such as a clutch or brake. The electromagnetic valve 20 is also configured as a normally open linear solenoid valve in which an input port 52 is open in an initial state. A solenoid part (electromagnetic part) 30, as well as a pressure-regulating valve part 40 that inputs a line pressure driven by the solenoid part 30, and adjusts and outputs the inputted line pressure, are provided in the electromagnetic valve 20.

The solenoid part (electromagnetic part) 30 includes: a case 31, a coil (solenoid coil) 32, a first core 34, a second core 35, and a plunger 36. The case 31 serves as a bottomed cylindrical member. The coil 32 is arranged on the inner peripheral side of the case 31 and formed by an insulated electrical conductor wound around an insulative bobbin 32a. The first core 34 is formed with a flange part 34a, with a flange outer peripheral part thereof fixed to the opening end part of the case 31, and also formed with a cylindrical part 34b that extends in an axial direction along the inner peripheral face of the coil 32 from the flange part 34a. The cylindrical second core 35 contacts the inner peripheral face of a concave part formed on the bottom part of the case 31, and extends in the axial direction along the inner peripheral face of the coil 32 up to a position that is separated from the cylindrical part 34b of the first core 34 by a predetermined distance. The plunger 36 is accommodated in the second core 35, and can slide in the axial direction on the inner peripheral face of the first core 34 and the inner peripheral face of the second core 35. A shaft part 72 of a valve shaft 70 is accommodated in the cylindrical part 34b of the first core 34 and contacts the tip of the plunger 36, and can slide in the axial direction on the inner peripheral face of the cylindrical part 34b. The solenoid part 30 is arranged on a connector part 39 with a terminal from the coil 32 formed on the outer peripheral part of the case 31, and electricity is conducted to the coil 32 through this terminal.

Regarding a tip part of the cylindrical part 34b of the first core 34, an outer face thereof is formed tapered such that its outer diameter decreases toward the tip, and an inner face thereof is formed with a plunger receiver 34c that can fit together with the tip part of the plunger 36 by insertion. Note that the tip part of the plunger 36 has an outer diameter that is larger than the outer diameter of the shaft part 72. The plunger receiver 34c is provided with an annular ring 34d, which is formed using a non-magnetic material, such that the plunger 36 does not directly contact the first core 34.

The case 31, the first core 34, the second core 35, and the plunger 36 are all formed by a ferromagnetic material such as highly pure iron or the like. A space between the end face of the cylindrical part 34b of the first core 34 and the end face of the second core 35 is formed to function as a non-magnetic body. It should be noted that this space may be provided as a non-magnetic metal such as stainless steel, brass, or the like so long as it functions as a non-magnetic body.

In the solenoid part 30, the conduction of electricity to the coil 32 forms a magnetic circuit in which magnetic flux circles around the coil 32 in the order to the case 31, the second core 35, the plunger 36, the first core 34, and the case 31. Consequently, an attractive force acts between the first core 34 and the plunger 36 such that the plunger 36 is attracted. As described above, the tip of the plunger 36 contacts the shaft part 72 that is slidable in the axial direction on the inner peripheral face of the first core 34. Therefore, the attractive force acting on the plunger 36 causes the valve shaft 70 to extrude forward (left in the figure).

As shown in FIG. 1, the pressure-regulating valve part 40 includes a sleeve 42, a flow-changing part 60, and the valve shaft 70. The generally cylindrical sleeve 42 is hollow with one end attached to the case 31 and the first core 34 of the solenoid part 30. The flow-changing part 60 is a generally cylindrical hollow member that is accommodated in the internal space of the sleeve 42, and divides the internal space of the sleeve 42. The flow-changing part 60 forms a flow path wherein hydraulic oil that enters inside the sleeve 42 flows into the internal part of the hollow member and forms a flow path wherein the outer peripheral face of the hollow member and the inner peripheral face of the sleeve 42 are in communication, and switches between the flow paths. The valve shaft 70 is in contact with the tip of the plunger 36, accommodated within the flow-changing part 60, and opens and closes the valve together with the flow-changing part 60.

An end part of the sleeve 42 is attached with an end plate 46. The following are formed as opening parts of the internal space of the sleeve 42: an input port 52, an output port 54, a drain port 56, and output pressure chamber 57, and a discharge hole 58. The input port 52 is formed on the end plate 46 and inputs in the axial direction hydraulic oil whose pressure has been adjusted to the line pressure. The output port 54 is formed at the general center of a side face of the sleeve 42 and outputs hydraulic oil to a clutch CL side. The drain port 56 is formed at a rightward location on the side face of the sleeve 42 and discharges hydraulic oil. Hydraulic oil whose pressure has been adjusted to the line pressure flows into the output pressure chamber 57, and the output pressure chamber 57 applies a fluid pressure to the flow-changing part 60 in the forward direction (left direction in the figure). The discharge hole 58 discharges hydraulic oil that has leaked out from between the inner peripheral face of the sleeve 42 and the outer peripheral face of the valve shaft 70 as a result of movement of the valve shaft 70. The sleeve 42 is also formed with a stepped inner wall that is structured by a small-diameter part 55 that is formed generally identical to the outer diameter of the flow-changing part 60, and a large-diameter part 53 that is formed with a diameter larger than that of the small-diameter part 55.

The flow-changing part 60 contacts the input port 52 and an end part of the flow-changing part 60 is attached with a switch plate 62 that switches the flow path. The following are formed as opening parts of the internal space of the flow-changing part 60: a throttle opening 64, an output opening part 66, a discharge opening part 68, and a communication part 67. The throttle opening 64 is formed on the switch plate 62 and inputs hydraulic oil in the axial direction. The output opening part 66 opens toward the output port 54, and the discharge opening part 68 opens toward the discharge port 56. The communication part 67 communicates the output opening part 66 with the discharge opening part 68 and the valve shaft 70 is accommodated therein. In addition, the throttle opening 64 is shaped having a diameter that is smaller than the diameter of the input port 52. The throttle opening 64 is also formed at a position that enables communication with the input port 52 when the switch plate 62 contacts the outer edge of the input port 52. The communication part 67 is formed larger than the diameter of the valve shaft 70, and hydraulic oil can flow through a flow path that is formed by a clearance between the communication part 67 and the valve shaft 70. Because the outer diameter of the flow-changing part 60 is generally identical to the small-diameter part 55 of the sleeve 42, the flow-changing part 60 can slide and move with the small-diameter part 55 of the sleeve 42, thereby forming a space where hydraulic oil can flow between these and the large-diameter part 53. Consequently, in a state where electricity is not conducted to the coil 32 (referred to as an initial state below), as illustrated in the enlarged view in FIG. 1, a flow path A and a flow path B are formed. In the flow path A, hydraulic oil that enters through the input port 52 flows inside via throttling by the throttle opening 64 can be output from the output port 54 through the output opening part 66, and can be discharged from the discharge port 56 through the communication part 67 and the discharge opening part 68. In the flow path B, hydraulic oil that enters through the input port 52 flows between the outer peripheral face of the flow-changing part 60 and the inner peripheral face of the large-diameter part 53 of the sleeve 42 without throttling, and is directly output from the output port 54. When the switch plate 62 moves in cooperation with the axial movement of the valve shaft 70 and contacts the outer edge of the input port 52, the flow path B is blocked by the contacting face; however, when the switch plate 62 separates from the input port 52, the flow path B is opened. Regarding axial fluid pressures that act on the flow-changing part 60, there is a fluid pressure that acts in the forward direction (left direction in the figure) and rearward direction (right direction in the figure) due to hydraulic oil entering through the input port 52, and there is a fluid pressure that acts in the forward direction due to hydraulic oil entering the output pressure chamber 57. Here, the hydraulic oil entering through the input port 52 and the hydraulic oil entering the output pressure chamber 57 both have the same pressure, namely, the line pressure, and the sectional area subject to the fluid pressures acting in the forward direction is smaller than the sectional area subject to the fluid pressure acting in the rearward direction. Therefore, the fluid pressure acting in the rearward direction is larger, and this difference in pressure presses the flow-changing part 60 rearward in the initial state. However, the fluid pressure acting in the rearward direction is always partially canceled out by the fluid pressures acting in the forward direction. Thus, forming the output pressure chamber 57 minimizes the thrust necessary for moving the flow-changing part 60 forward, whereby a more compact solenoid part 30 can be achieved.

The flow-changing part 60 is attached with a spring (biasing means) 76 that biases the valve shaft 70 rearward (rightward in the figure), with the switch plate 62 acting as a spring (biasing means) receiver. The spring 76 presses the valve shaft 70 rearward in the initial state; however, when electricity is conducted to the coil 32, the biasing force is set so as to expand or contract the spring 76 depending on the magnitude of a counteraction from the switch plate 62, which through the valve shaft 70 and the spring 76 receives the attractive force acting on the plunger 36. In other words, the biasing force is set such that the spring 76 hardly expands or contracts, even if the valve shaft 70 moves, until the switch plate 62 contacts the outer edge of the input port 52, and also set such that following contact, the spring 76 expands or contracts depending on the magnitude of the counteraction, i.e., attractive force, from the switch plate 62. Thus, before contact, the flow-changing part 60 and the valve shaft 70 can be cooperatively moved while continuing to press the valve shaft 70 rearward, and after contact, the position of the valve shaft 70 relative to the flow-changing part 60 can be adjusted depending on the magnitude of attractive force.

The valve shaft 70 is formed as an shaft-like member that is accommodated in the internal space of the flow-changing part 60. The valve shaft 70 includes the shaft part 72, which is formed such that a portion that contacts the plunger 36 and is accommodated in the communication part 67 has a smaller diameter, and also includes a flow-rate adjustment part 74 that adjusts the flow rate of hydraulic oil that flows in and out of the internal space of the flow-changing part 60. The flow-rate adjustment part 74 has a cylindrical part 74a, a flange part 74b, and a tapered part 74c. The cylindrical part 74a is formed with a diameter that is larger than the throttle opening 64, and when the cylindrical part 74a contacts the switch plate 62, the contact face of the cylindrical part 74a blocks the throttle opening 64. The flange part 74b is formed with a diameter that is larger than the cylindrical part 74a, and is in contact with the spring 76. The tapered part 74c has an outer diameter that is smaller than the flange part 74b and is formed in a tapered shape such that the outer diameter becomes smaller in the direction of the shaft part 72. When the tapered part 74c contacts the outer edge of the communication part 67, the tapered part 74c blocks the flow path in the clearance between the communication part 67 and the valve shaft 70 so as to block the flow of hydraulic oil to the drain port 56.

Figure 2A:
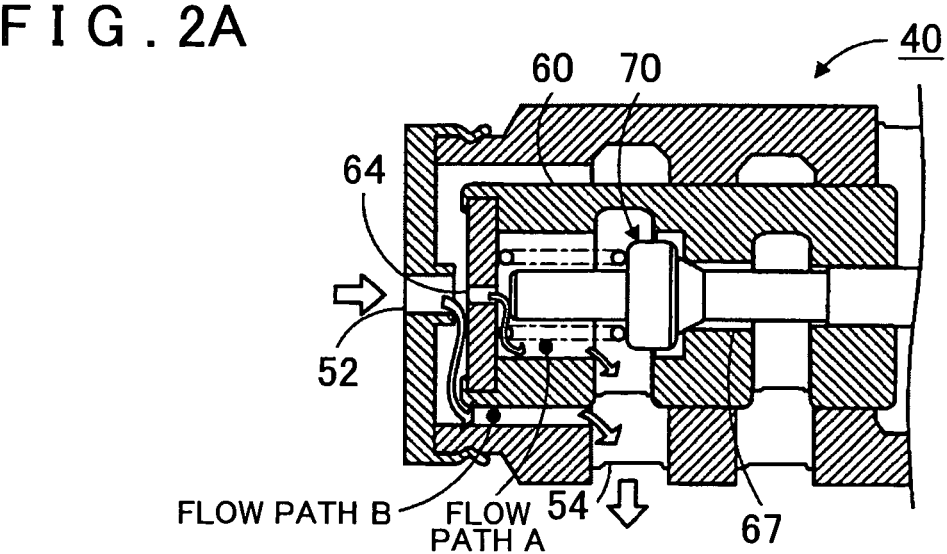
FIG. 2 is an explanatory drawing that shows a state of a pressure-regulating valve part 40 during operation of the electromagnetic valve 20.
Figure 2B:
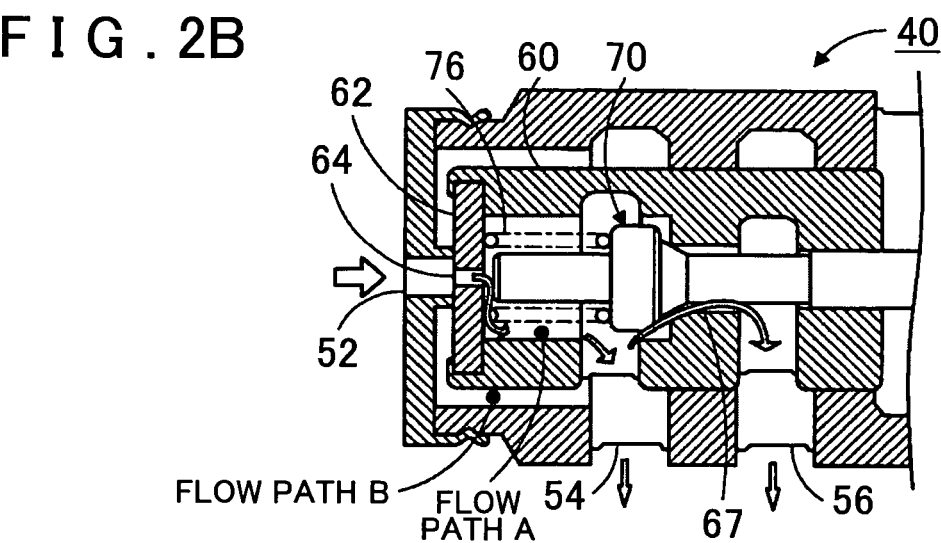
Figure 2C:
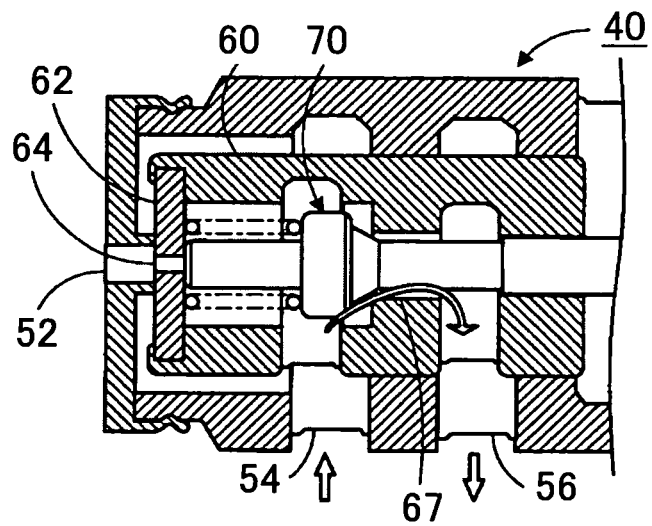

The operation of the electromagnetic valve 20 according to the embodiment with the above configuration will be explained based on FIG. 2. FIG. 2 is an explanatory drawing that shows the state of the pressure-regulating valve part 40 during operation of the electromagnetic valve 20. An example of operation in the initial state will be considered first. In this case, the flow-changing part 60 and the valve shaft 70 as described above are pressed rearward, thereby opening the flow path A and the flow path B while blocking the communication part 67 as illustrated in FIG. 2A. Consequently, all hydraulic oil entering through the input port 52 can be output to the output port 54. An example of operation when the conduction of electricity to the coil 32 is started will be considered next. In this case, the valve shaft 70 moves forward, and as described above, the flow-changing part 60 and the valve shaft 70 cooperatively move with the spring 76 hardly expanding or contracting. Consequently, the flow path A stays open while the communication part 67 remains blocked, and the flow path B is gradually blocked as the above movement progresses. When the switch plate 62 contacts the outer edge of the input port 52, the contact surface of the switch plate 62 blocks the flow path B, and the spring 76 expands or contracts such that the valve shaft 70 stops at a position where the biasing force and the attractive force are balanced. This state is shown in FIG. 2B. As the figure illustrates, the flow path B is blocked so that the input port 52 and the throttle opening 64 are in communication, and the communication part 67 is opened so that the output port 54 and the discharge port 56 are in communication. Accordingly, due to the small input amount of hydraulic oil flowing in from the throttle opening 64 through throttling and the balance between the biasing force and the attractive force, movement of the valve shaft 70 forward is accompanied by a corresponding increase in the discharge amount from the drain port 56 and a corresponding decrease in the output amount from the output port 54. Meanwhile, movement of the valve shaft 70 rearward is accompanied by a corresponding decrease in the discharge amount from the drain port 56 and a corresponding increase in the output amount from the output port 54. Thus, when accompanying discharge from the drain port 56, the discharge amount can be reduced because the flow path B is blocked and the input amount of hydraulic oil is decreased. If the attractive force completely exceeds the biasing force, the valve shaft 70 contacts the switch plate 62 as shown in FIG. 2C, and the contact face of the valve shaft 70 blocks the throttle opening 64 and communicates the output port 54 with the drain port 56. This consequently lowers the hydraulic pressure acting on the clutch CL. It should be noted that if the conduction of electricity to the solenoid part 30 is blocked during the state shown in FIG. 2C, the valve shaft 70 is pressed rearward by the biasing force of the spring 76 and separates from the switch plate 62. The valve shaft 70 and the flow-changing part 60 thus return to their initial positions as a result of the fluid pressure acting thereon that is generated by hydraulic oil flowing in again.

Figure 3A:
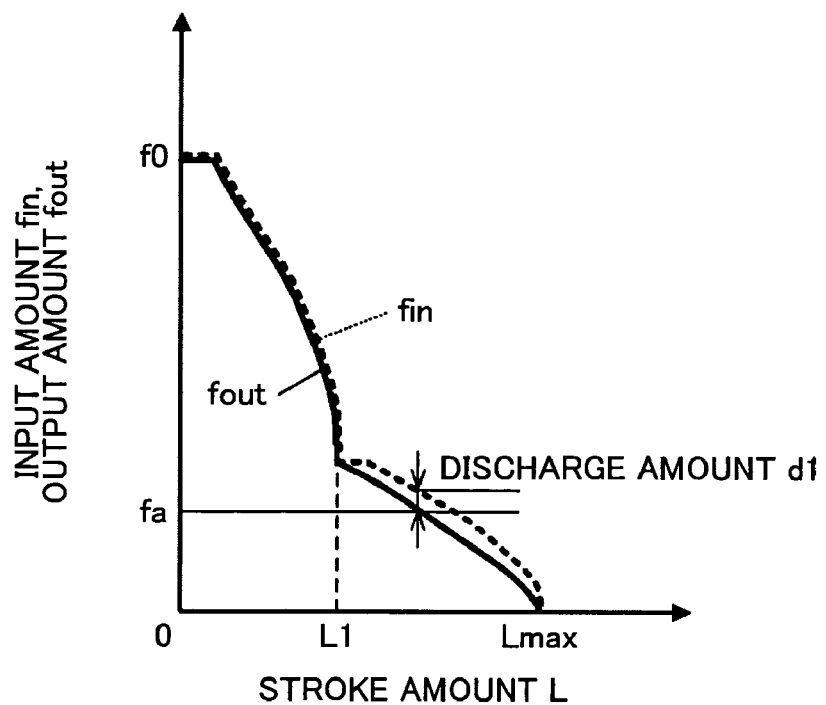
FIG. 3 is an explanatory drawing that shows changes in an input amount from an input port 52 and in an output amount from an output port 54 during operation of the electromagnetic valve 20.
Figure 3B:
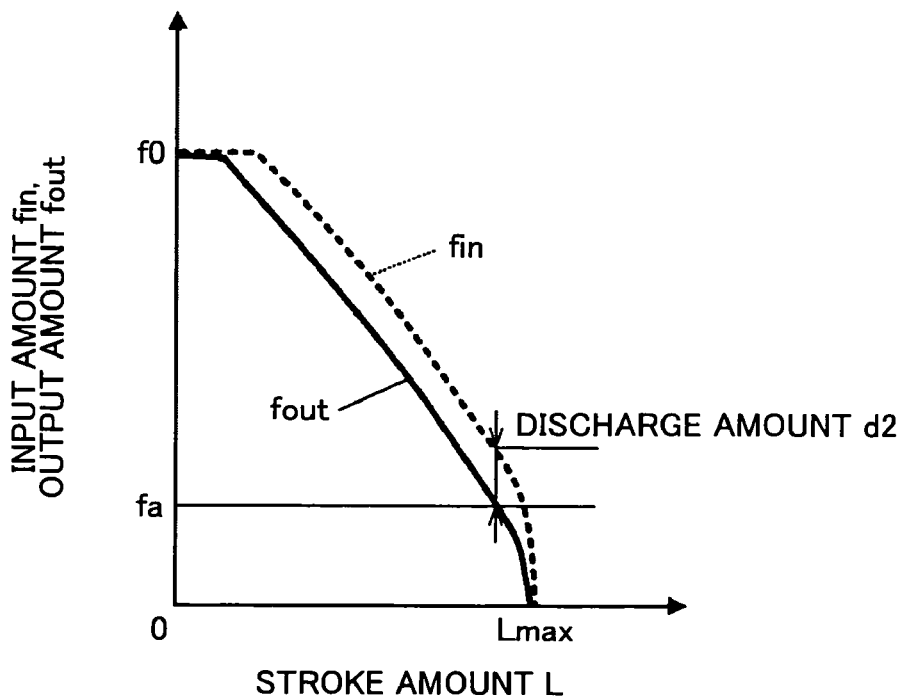

Changes in the input amount from the input port 52 and in the output amount from the output port 54 during operation of the electromagnetic valve 20 described above will be explained next based on FIG. 3. FIG. 3A shows changes in the input and output amounts according to the present embodiment, and FIG. 3B shows changes in the input and output amounts according to a comparative example. The comparative example differs from the present embodiment in that it is configured without the flow-changing part, and the input amount is not throttled even with discharge from the drain port. When the valve shaft moves, a flow rate is output from the output port with adjustment of the discharge amount from the drain port. In both FIGS. 3A and 3B, the horizontal axes indicate a stroke amount L of the valve shaft 70, and the vertical axes indicate an input amount fin and an output amount fout. The stroke amount L is set so as to become the value 0 in the initial state, and a maximum value Lmax at a position that closes the input port 52. According to the present embodiment and as illustrated in FIG. 3A, when the stroke amount L is the value 0, the input amount fin and the output amount fout both are equivalent to a value f0. If the stroke amount L gradually increases, the flow path B is gradually blocked and the input amount fin decreases, which is accompanied by a decrease in the output amount fout. Following the flow-changing part 60 contacting the outer edge of the input port 52 (a stroke amount L1), the flow path B is blocked so that hydraulic oil only flows through the flow path A, and the flow rate adjusted with the discharge from the discharge port 56 becomes the output amount fout. Here, for example, when the output amount fout is a value fa, hydraulic oil of a discharge amount d1 is discharged from the discharge port 56, as shown in the figure. Note that if the stroke amount L reaches the maximum value Lmax, the input amount fin and the output amount fout both become the value 0. Meanwhile, according to the comparative example, the flow rate adjusted through discharge from the discharge port with respect to the input amount fin becomes equivalent to the output amount fout once the valve shaft 70 starts moving. Consequently, the flow rate changes as illustrated in FIG. 3B. In the comparative example, it is clear that if the value fa is output as the output amount fout, hydraulic oil of a discharge amount d2 is discharged as shown in the figure, and hydraulic oil is discharged in an amount greater than the discharge amount d1. Thus, in comparison with an example that does not switch between flow paths, the present embodiment can further reduce the discharge amount to be output with adjustment of the discharge amount.

According to the electromagnetic valve 20 of the embodiment described above, the flow path A and the flow path B are formed therein. In the flow path A, hydraulic oil that enters through the input port 52 due to the flow-changing part 60 accommodated in the sleeve 42 subsequently flows further inside through throttling by the throttle opening 64, after which the hydraulic oil is output from the output port 54 as well as discharged from the drain port 56. In the flow path B, hydraulic oil flows between the outer peripheral face of the flow-changing part 60 and the inner peripheral face of the sleeve 42 without throttling and is directly output from the output port 54. In addition, switching may be performed among three states: a state in which the flow-changing part 60 and the valve shaft 70 are used to block the drain port 56 depending on the flow rate to be output from the output port 54 and pass hydraulic oil through the flow path A and the flow path B; a state in which the flow path B is blocked and hydraulic oil flows through the flow path A with adjustment of the open state of the drain port 56; and a state in which the throttle opening 64 is blocked to close the input port 52 and the output port 54 is in communication with the drain port 56. As a consequence, a required output amount can be secured while suppressing the discharge amount.

The electromagnetic valve 20 of the embodiment is configured as a normally open linear solenoid valve in which the input port 52 is open in the initial state. However, the electromagnetic valve 20 may also be configured as a normally closed linear solenoid valve in which the input port 52 is closed in the initial state.

The electromagnetic valve 20 of the embodiment is used in a hydraulic control of the clutch CL incorporated in an automatic transmission. However, the electromagnetic valve 20 may be used in a hydraulic control of any hydraulic mechanism that operates using hydraulic oil, and may also be employed as an electromagnetic valve that is not used for a direct control.

The above embodiment was used to describe a best mode for carrying out the present invention. However, the present invention is not particularly limited to such an example, and may obviously be carried out using various embodiments without departing from the scope of the present invention.

The present invention may be used in the automobile industry, the electromagnetic valve manufacturing industry, and the like.

The invention claimed is:

1. A bleed solenoid valve comprising:
a valve main body that is hollow and formed with an input port into which hydraulic fluid flows in an axial direction, an output port that outputs hydraulic fluid sideward, and a discharge port that discharges hydraulic fluid sideward;
a flow-changing part that is accommodated inside the valve main body, and formed with a first flow path, wherein hydraulic fluid that enters through the input port and flows inside due to a throttle may be output from the output port and discharged from the drain port, and a second flow path, wherein hydraulic fluid is directly output from the output port without passing through the throttle, with the flow-changing part switching between blocking and opening the second flow path in accordance with movement in the axial direction;
a valve shaft that is accommodated inside the flow-changing part, and capable of switching among a state in which the discharge port is closed with axial movement of the flow-changing part and the valve shaft, and hydraulic fluid flows through the first flow path and the second flow path, a state in which the second flow path is blocked and hydraulic fluid flows through the first flow path with adjustment of the open state of the discharge port, and a state in which the input port is closed and the output port is in communication with the discharge port; and
a solenoid part that moves the valve shaft in the axial direction.

2. The bleed solenoid valve according to claim 1, wherein the flow-changing part is a hollow member having an end part that is formed with an opening part having a diameter smaller than the input port, wherein
entry through the opening part corresponds to the throttle of the first flow path,
the second flow path is set between an outer peripheral face of the flow-changing part and an inner peripheral face of the valve main body, and
when the flow-changing part contacts the valve main body in accordance with axial movement, the second flow path is blocked by a face of the flow-changing part contacting the valve main body.

3. The bleed solenoid valve according to claim 2, wherein the flow-changing part is attached with biasing means that biases the valve shaft toward the solenoid part side, wherein
the valve shaft terminates contact with the flow-changing part due to the biasing force of the biasing means to release the throttle and block communication between the output port and the discharge port when the solenoid part is not driving; moves in cooperation with the flow-changing part while the throttle remains open through the biasing force of the biasing means until the flow-changing part contacts the valve main body when the solenoid part is driving, so as to move in a direction that gradually blocks the second flow path; moves after the flow-changing part contacts the valve main body to block the second flow path without moving in cooperation with the flow-changing part against the biasing force when the driving force of the solenoid part exceeds the biasing force of the biasing means; and uses a flow path that becomes larger nearer the throttle to communicate the output port with the discharge port, and contacts the flow-changing part in the axial direction, whereby the throttle is blocked by a face of the flow-changing part contacting the valve shaft and the output port communicates with the discharge port.

4. The bleed solenoid valve according to claim 1, wherein the valve main body comprises an output pressure chamber formed such that a fluid pressure that acts on the flow-changing part due to hydraulic fluid laterally entering and being input through the input port is partially canceled out by a fluid pressure acting in a direction opposite to said fluid pressure.

5. The bleed solenoid valve according to claim 1, wherein the bleed solenoid valve is a valve capable of inputting a line pressure adjusted by a regulator valve through the input port and adjusting the input line pressure, and outputting a direct hydraulic pressure through the output port to one of a clutch and a brake incorporated in an automatic transmission that receives a supply of hydraulic pressure to operate.

* * * * *